United States Patent [19]

Crayne et al.

[11] 4,375,258
[45] Mar. 1, 1983

[54] REUSABLE ENCLOSED CARRIER CARTON

[75] Inventors: Jerry W. Crayne; Natalie A. Wolff; David L. Botterman, all of Arlington, Tex.

[73] Assignee: Container Corporation of America, Chicago, Ill.

[21] Appl. No.: 253,096

[22] Filed: Apr. 13, 1981

[51] Int. Cl.³ .............................................. B65D 5/54
[52] U.S. Cl. .................................... 206/141; 206/620; 206/427
[58] Field of Search ............... 206/167, 427, 624, 626, 206/628, 141, 45.31, 140, 147, 149, 155, 162, 614; 229/52 BC, 40

[56] References Cited

U.S. PATENT DOCUMENTS

| | | | |
|---|---|---|---|
| Re. 27,624 | 4/1973 | Helms | 229/40 X |
| 3,181,727 | 5/1965 | Graser et al. | 206/155 |
| 3,186,545 | 6/1965 | Conrades | 206/155 |
| 3,217,924 | 11/1965 | Chidsey | 206/155 |
| 3,270,914 | 9/1966 | Graser | 206/140 |
| 3,294,280 | 12/1966 | Graser | 206/155 |
| 3,309,005 | 3/1967 | Pilger | 206/628 |
| 3,348,672 | 10/1967 | Brown | 206/197 |
| 3,353,709 | 11/1967 | Lawrence | 206/141 |
| 3,355,089 | 11/1967 | Champlin | 206/612 |
| 3,403,839 | 10/1968 | Farquhar | 229/40 |
| 3,554,402 | 1/1971 | Lock | 206/193 |
| 3,578,238 | 5/1971 | Schillinger | 229/40 |
| 3,627,193 | 12/1971 | Helms | 229/40 X |
| 3,670,950 | 6/1972 | Rossi | 229/40 |
| 3,688,972 | 9/1972 | Mahon | 206/612 |
| 3,692,232 | 9/1972 | Helms | 229/52 B |
| 3,696,990 | 10/1972 | Dewhurst | 229/37 R |
| 3,712,533 | 1/1973 | Skillen | 206/628 |
| 3,986,658 | 10/1976 | Arneson et al. | 229/40 |
| 4,029,207 | 6/1977 | Gordon | 206/427 |
| 4,155,449 | 5/1979 | Bryne | 206/427 |

Primary Examiner—William Price
Assistant Examiner—Brenda J. Ehrhardt
Attorney, Agent, or Firm—Richard W. Carpenter; Davis Chin

[57] ABSTRACT

A fully enclosed carrier carton for bottles or the like having removable portions to provide access to the contents of the carton without destroying the integrity of the carton for reuse.

5 Claims, 5 Drawing Figures

REUSABLE ENCLOSED CARRIER CARTON

BACKGROUND OF THE INVENTION

1. Field of the Invention

This invention relates to carrier cartons for bottles or the like and more particularly to an enclosed carton having portions which are detachable to provide access to the interior of the carton without destroying the integrity of the carton and preventing its reuse.

2. Description of the Prior Art

A state of the art search directed to the subject matter of this application uncovered the following U.S. Pat. Nos: Re. 27,624; 3,004,036; 3,181,727; 3,186,545; 3,217,924; 3,270,914; 3,294,280; 3,309,005; 3,348,672; 3,355,089; 3,403,839; 3,405,332; 3,554,402; 3,578,238; 3,627,193; 3,670,950; 3,688,972; 3,692,232; 3,696,990; 3,712,533; 3,986,658; 4,029,207; 4,155,449.

None of the prior art patents uncovered in the search disclose a completely enclosed carrier carton having end portions removable in such a manner as to preserve the integrity of the carton for its reuse.

SUMMARY OF THE INVENTION

An object of the invention is to provide a paperboard carrier carton for bottles or the like which is completely enclosed to shield the contents of the carton from the light and which also has sections which are detachable from the remaining portions of the carton to provide access to the contents without destroying the integrity of the carton and preventing its reuse.

A more specific object of the invention is the provision, in a carton of the type described, of end sections formed of portions of end walls, side walls and top wall which are detachable to provide access to the interior of the carton.

These and other objects of the inventions will be apparent from an examination of the following description and drawings.

It will be understood that, for purposes of clarity, certain elements may have been intentionally omitted from certain views where they are believed to be illustrated to better advantage in other views.

DESCRIPTION OF THE PREFERRED EMBODIMENT

Figure 1:
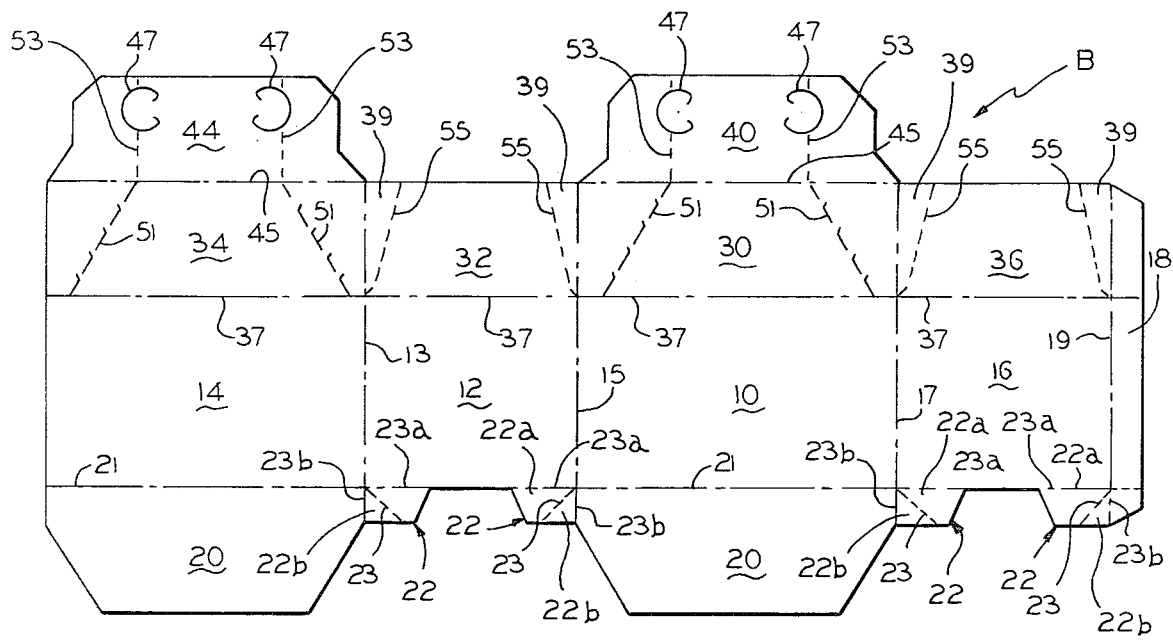
FIG. 1 is a plan view of blank of foldable sheet material such as paperboard, from which the carton illustrated in the other views may be formed.
Figure 2:
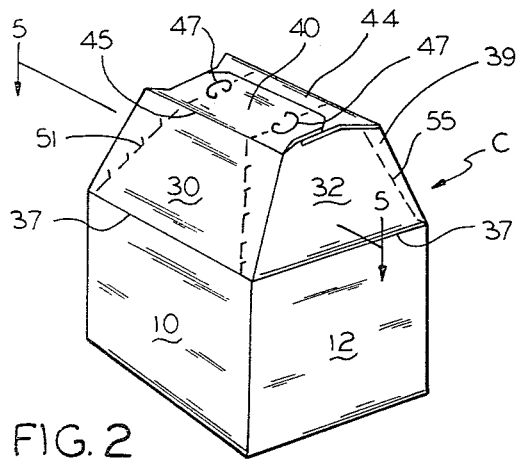
FIG. 2 is a perspective view of a completely closed carton formed from the blank of FIG. 1 and embodying features of the invention.
Figure 3:
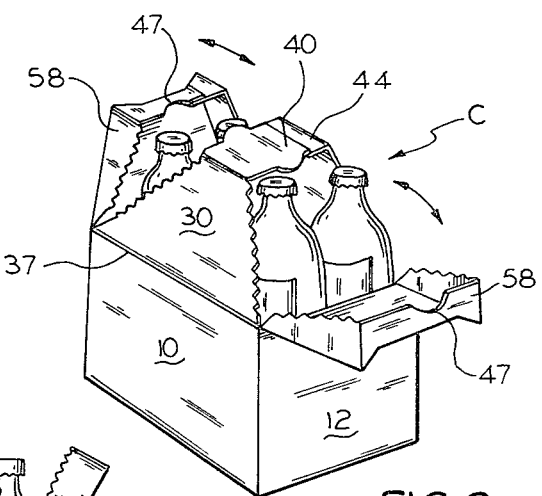
FIG. 3 is a view similar to FIG. 2 but showing portions of the structure removed to provide access to the interior of the carton.
Figure 4:
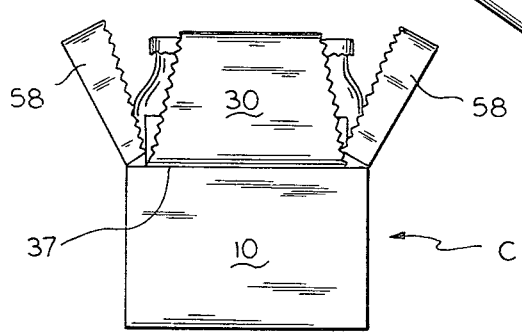
FIG. 4 is a side elevational view of the structure illustrated in FIG. 3.

Referring now to the drawings for a better understanding of the invention, it will be seen that the carrier carton, indicated generally at C in FIGS. 2 through 4, is adapted to enclose a plurality of articles A, such as beverage bottles, and may be formed from a unitary blank B of foldable sheet material illustrated in FIG. 1.

As best seen in FIG. 1 the body portion of the carton includes a first side wall panel 10, a first end wall panel 12, a second side wall panel 14, a second end wall panel 16, and a glue flap 18, which are foldably joined to each other along fold lines 13, 15, 17, and 19 to form a tubular structure open at the top and bottom.

Closure of the bottom of the carton is accomplished by a pair of bottom closure flaps 20 which are foldably joined along fold lines 21 to the lower edges of first and second side wall panels 10 and 14, respectively. Bottom closure flaps 20 may also be joined to adjacent end wall panels 12 and 16 and glue flap 18 by means of relatively small gusset members 22, each of which includes a pair of generally triangular gusset elements 22a and 22b which are foldably joined to each other along a diagonal fold line 23 and which are foldably joined to related end walls and bottom closure flaps along fold lines 23a and 23b, respectively.

The bottom closure flaps 20 are secured to each other in at least partially overlapped relation to close the bottom of this structure.

The body walls of the carton have upper portions which, as hereinafter described, are seen to slope inwardly toward the top.

Figure 5:
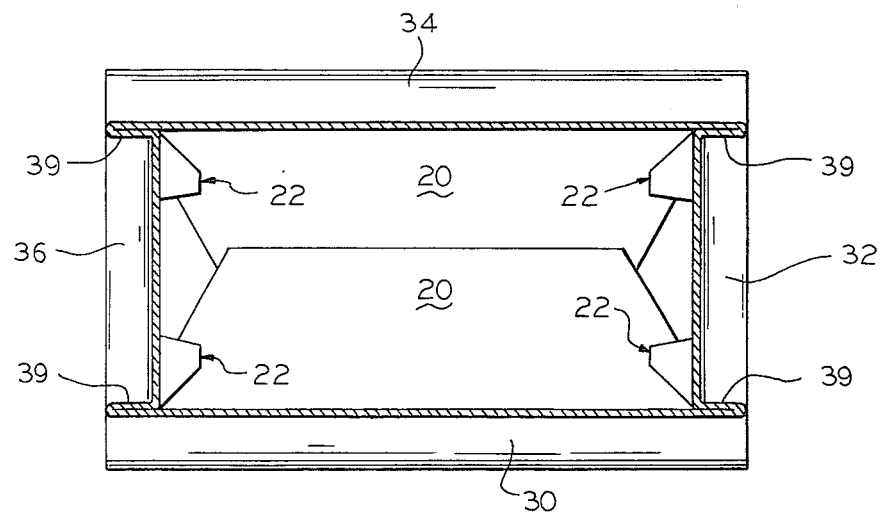
FIG. 5 is a front horizontal cross-sectional view taken along the lines 5—5 of FIG. 2.

As can best be seen from FIG. 5, there is shown a horizontal cross-sectional view illustrating the gusset elements 22a and 22b in the fully assembled condition.

These upper sections designated as first side wall upper section 30, first end wall upper section 32, second side wall upper section 34, and second end wall upper section 36 are foldably joined to their related side and end wall panels along aligned fold lines 37.

Each of the first and second end wall upper sections 32, 36 include side sections 39 which foldably interconnect the remaining section to adjacent first and second side wall upper sections and are disposed to be against inner surfaces of the first and second side wall upper sections.

Closure of the top of the carton is accomplished by a pair of first and second top wall panels or closure flaps 40 and 44 which are foldably joined along fold lines 45 to the upper edges of first and second side wall upper sections 30 and 34, respectively.

Top closure panels 40 and 44 are provided with aligned curved cuts 47 which define finger opening for lifting and carrying the carton when it is in the closed position, as illustrated in FIG. 2.

As best seen in FIG. 1, the upper portions 30 and 34 of the side wall panels 10 and 14 are provided with cut lines 51 and the upper portions of the end wall panels 12 and 16 are provided with fold lines 55. Also the top closure panels 40 and 44 are provided with cut lines 53 which are an extension of cut lines 51 of the adjacent panels.

Thus, when the carton is in closed position with the top closure panels 40 and 44 secured to each other in overlapped relation, it will be seen that the portions of the side wall panel upper sections 30 and 34 which lie outboardly of the cut lines 51 and portions of the top closure flaps 40 and 44 which lie outboardly of the cut lines 53 together with upper portions 32 and 36 of the end panels, form a pair of opposed detachable sections which may be separated from the remaining section of the carton, as illustrated in FIGS. 3 and 4, by tearing along the weakened lines of tear.

This permits access to the carton, so that it is possible to remove the contents from the carton. At the same time it does not destroy the total integrity of the carton which may be reused to return empty bottles for their reuse.

Thus it will be understood that the carton provides a novel structure which is light-tight so as to shield the contents of the carton from light, but which at the same time has portions removable to provide access to the interior of the carton without destroying the carton for its reuse.

We claim:

1. A fully enclosed article carrier carton, formed of a unitary blank of foldable paperboard, and having removable portions to provide access to the contents of the carton without destroying the integrity of the carton for reuse with empty bottles, said carton comprising:
   (a) opposed pairs of side and end wall panels foldably joined to each other to form a tubular structure open at the top and bottom;
   (b) said side and end wall panels having upper side wall and end wall sections foldably joined to their related side and end wall panels;
   (c) bottom closure flaps foldably joined to lower edges of said side wall panels and secured to each other in at least partially overlapped relation to close the bottom of said structure;
   (d) top closure flap foldably joined to upper edges of said upper side wall sections and secured to each other in at least partially overlapped relation to close the top of said structure; and
   (e) portions of said upper side wall sections, said upper end wall sections and portions of said top closure flaps forming opposed detachable end portions which are joined to the remaining portions thereof by weakened lines of tear which permit said end portions to be detached from said remaining portions to provide access to the contents of the carton without destroying the integrity of the center so that it can have limited reuse.

2. A carton according to claim 1 including gusset panel means foldably joining end edges of said bottom closure flaps to adjacent lower edges of related end wall panels.

3. A carton according to claim 1, wherein said side and end wall panels are separated from said upper side and end wall section by horizontally disposed fold lines.

4. A carton according to claim 1, wherein said detachable end portions remain attached to respective end walls after being detached along said weakened lines of tear.

5. A carton according to claim 1, wherein said end wall upper sections include side sections foldably interconnecting the remaining section to adjacent upper side wall sections and being disposed to be against inner surfaces of said upper side wall sections.

* * * * *